United States Patent [19]

Wittke

[11] Patent Number: 4,879,826

[45] Date of Patent: Nov. 14, 1989

[54] ILLUMINATED CHARACTERS OF GRAPHIC SYMBOLS FOR EXTERNAL FIXING TO VEHICLES

[76] Inventor: Christian A. Wittke, Gartenstrasse 17, Jagsthausen D-7109, Fed. Rep. of Germany

[21] Appl. No.: 274,021

[22] Filed: Nov. 21, 1988

Related U.S. Application Data

[63] Continuation-in-part of Ser. No. 29,325, Mar. 23, 1987, abandoned.

[30] Foreign Application Priority Data

Mar. 26, 1986 [DE] Fed. Rep. of Germany ..... 36102903

[51] Int. Cl.$^4$ .............................................. G09F 13/28
[52] U.S. Cl. ........................................ 40/551; 40/591; 40/542
[58] Field of Search ................. 40/550, 551, 591, 552

[56] References Cited

U.S. PATENT DOCUMENTS

| | | | |
|---|---|---|---|
| 1,067,024 | 7/1913 | Hall et al. ........................... | 40/350 |
| 1,192,982 | 8/1916 | Bristol et al. ....................... | 40/552 |
| 1,330,677 | 2/1920 | Blum .................................. | 40/550 |
| 1,373,167 | 3/1921 | Brooks ............................... | 40/551 |
| 1,617,425 | 2/1927 | Sulzberger ......................... | 40/542 |
| 3,995,152 | 11/1976 | Chao et al. . | |
| 4,028,828 | 6/1977 | Chao et al. ......................... | 40/552 |
| 4,179,832 | 12/1979 | Lemelson ........................... | 40/550 |
| 4,457,089 | 7/1984 | Phillips, Jr. . | |
| 4,607,444 | 8/1986 | Foster ................................ | 40/550 |
| 4,709,307 | 11/1987 | Branon ............................... | 40/550 |

FOREIGN PATENT DOCUMENTS

| | | | |
|---|---|---|---|
| 62312/80 | 9/1986 | Australia . | |
| 0239027 | 9/1987 | European Pat. Off. ............. | 40/591 |
| 3049064 | 7/1982 | Fed. Rep. of Germany . | |
| 8502755 | 11/1985 | Fed. Rep. of Germany . | |

Primary Examiner—Gene Mancene
Assistant Examiner—Wenceslao J. Contreras
Attorney, Agent, or Firm—Helfgott & Karas

[57] ABSTRACT

Illuminated characters or graphic symbols for external fixing to vehicles are constructed as active illuminating bodies and each includes a character shaped element, two deformable insulating layers and a cover formed to retain the shaped element and insulating layers together.

6 Claims, 1 Drawing Sheet

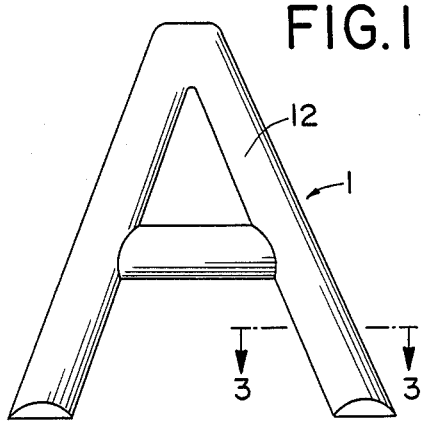
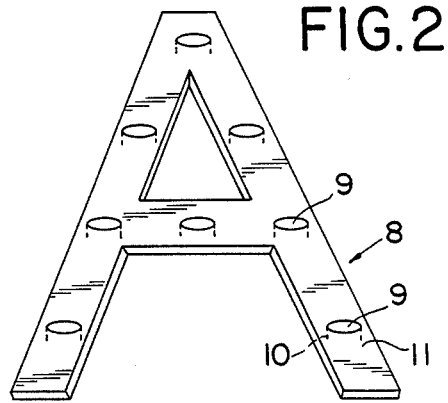
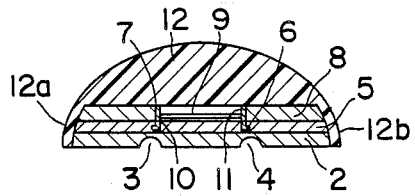
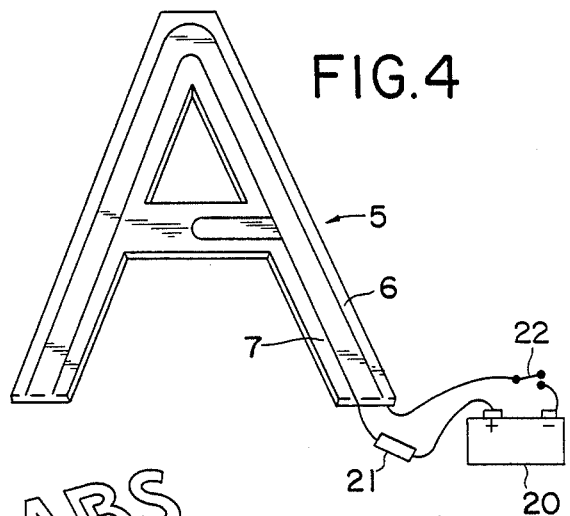
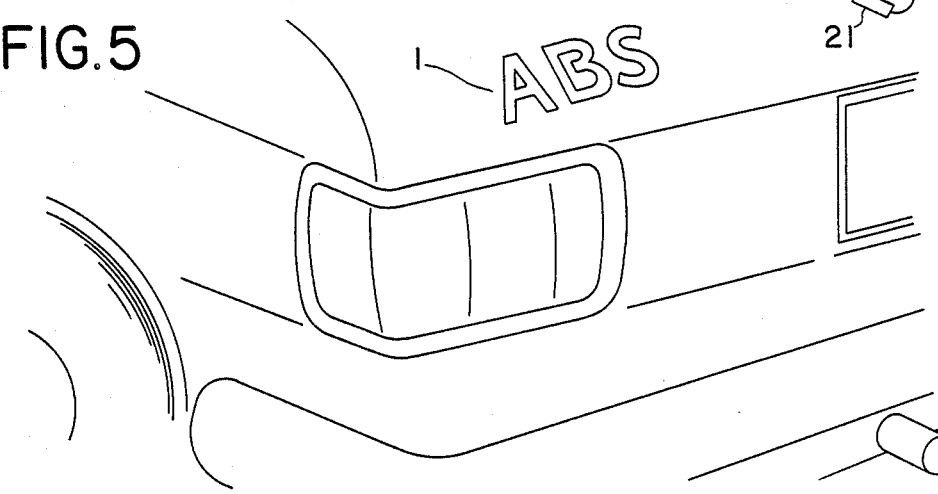

ILLUMINATED CHARACTERS OF GRAPHIC SYMBOLS FOR EXTERNAL FIXING TO VEHICLES

CROSS-REFERENCE TO RELATED APPLICATION

This application is a continuation-in-part of application Ser. No. 029,325 filed Mar. 23, 1987, now abandoned.

BACKGROUND OF THE INVENTION

The invention relates to illuminated characters or graphic symbols for external fixing to vehicles.

Illuminated characters on vehicles give information to the outside, for example, the information that the particular vehicle is a taxi is usually provided on the vehicle roof using a transparent material box illuminated from the inside on the outside and to which is fixed a plate having recesses in the form of the character group "TAXI" visible in illuminated form.

Such an indicator is unsatisfactory on the outside of vehicles for several reasons. An illuminated box of the aforementioned type cannot be fitted to the outer wall of a vehicle as a result of its dimensions, particularly its thickness, because it projects beyond the outer contour of the vehicle and is exposed to damage. If the known characters or graphic symbols, which are illuminated by means of an illuminated box are placed on the roof, radiator or trunk (boot) of a vehicle, they constitute a considerable obstacle to the air flow and, particularly at high speeds, this leads to increased fuel consumption and to a whistling noise of the slip stream.

Illuminating characters constructed as active illuminating bodies are admittedly known (German Pat. No. 3049064; documents of German Utility Model No. G 8502755.3), but these known characters are neither intended, nor suitable for external fixing to vehicles.

SUMMARY OF THE INVENTION

It is an object of the present invention to provide illuminated characters or graphic symbols for external fixing to vehicles, which have a flat construction and ensure a limited air flow resistance.

The characters or graphic symbols are constructed as active illuminating bodies.

According to the present invention illuminated characters or graphic symbols for external fixing to vehicles are provided, which do not require an illuminated box and are characterized by limited space requirements and in particular by a flat construction. The energy consumption for illuminating the characters or graphic symbols is also reduced, because there is no illuminated box in which the radiant energy is converted in unused form into heat.

Within the sense of the invention character or graphic symbol means figures, letters, pictograms, symbols, image patterns, or simply contour lines.

According to an advantageous embodiment of the invention the characters or graphic symbols having fixing means for engaging the outer wall of a vehicle and as a result of their flat construction only limited projection may occur, so that they are largely insensitive to mechanical stresses of all types.

According to another advantageous embodiment of the invention the fixing means comprise an adhesive layer applied to the back of the character or graphic symbol. Preferably the fixing surface for the character or graphic symbol is traversed by one or more grooves, so that excess adhesive can flow into these grooves, thereby ensuring a reliable seating of the character or graphic symbol on the vehicle body wall.

As explained hereinbefore, due to the small, flat construction of the characters or graphic symbols according to the invention, they have a limited air flow resistance, no matter whether they are located on a vehicle roof or an outer wall. According to a particularly advantageous inventive embodiment the air flow resistance of the character or graphic symbol can be further reduced in that a streamline form is given thereto, i.e. the shape thereof is such that only limited air flow resistance is caused. In the case of characters or graphic symbols, which are e.g. placed on a vehicle roof, the shape is chosen in such a way that in partial cross-section,, the characters or graphic symbols are round or oval.

In the case of characters or graphic symbols to be positioned in engaging manner on an outer vehicle wall, according to another embodiment of the invention a roughly circular segmental partial cross-section is provided.

According to a further embodiment the characters or graphic symbols contain at least one electrically operated light source. Compared with phosphorescent light sources, i.e. light sources which store light which is radiated in and irradiate it again in time-delayed manner, such an embodiment has the advantage of increased and in particular uniform luminosity.

According to yet another embodiment of the invention the characters or graphic symbols are illuminated by several light-emitting diodes (LED). According to another variant of the invention there are several glow lamps for illuminating the characters or graphic symbols.

According to still another embodiment of the invention, it is also possible to provide a tubular light source adapted to the shape of the characters or graphic symbols. As a filament lamp, it can be equipped with a filament. According to another advantageous embodiment, the tubular light source is constructed as a fluorescent lamp or tube.

According to another embodiment the tubular light source is constructed as a glow lamp, the glow discharge cathode shape being adapted to that of the character or graphic symbol.

The low energy consumption, particularly in conjunction with the use of light emitting diodes, makes it possible to supply the characters or graphic symbols with current from a solar cell unit. Thus, there is no need to lay a connecting cable to the vehicle battery. It is possible to compensate for power fluctuations of the solar cell unit by an interposed accumulator in a known fashion.

According to a particularly advantageous further development of the invention the characters or graphic symbols are built up from several layers. The top layer can be in the form of a cylindrical lens, which so scatters the light emitted by the light sources, e.g. light emitting diodes, that there is an impression of a large-area, uniformly radiating light source.

According to a further development of the invention the characters or graphic symbols are made from bendable material. This makes it possible to shape the characters or graphic symbols in such a way that the rear surfaces thereof engage snugly on a possibly curved surface of the vehicle body.

The aforementioned objects, features and advantages of the invention will, in part, be pointed out with particularity, and will, in part, become obvious from the following more detailed description of the invention, taken in conjunction with the accompanying drawing, which form an integral part thereof.

BRIEF DESCRIPTION OF THE DRAWINGS FIG. 1 is a perspective view of a character; FIG. 2 is a perspective view of one layer of the character of FIG. 1; FIG. 3 is a section along section line III—III of FIG. 4 is another layer from the character of FIG. 1; and FIG. 5 is a character group formed from characters applied to a motor vehicle.

DETAILED DESCRIPTION OF THE PREFERRED EMBODIMENT

An illuminated character 1 constructed from active self-illuminating bodies is shown in FIG. 1. The letter A of the alphabet is chosen as an example. As illustrated in FIG. 1, the character is circular segmental in partial cross-section, i.e. the individual "lines" of the "A" have a circular segmental cross-section.

As is shown by the partial cross-section of FIG. 3, the character is formed from several layers. A carrier layer 2 has two longitudinally directed grooves 3, 4. The carrier layer 2 is covered with a not shown adhesive layer. Above carrier layer 2 is provided an insulating material layer 5, in which are provided two printed conductors 6 and 7 running at right angles to the plane of the drawing. FIG. 4 shows the insulating material layer 5 in continuous perspective form, whilst FIG. 4 shows the path of printed conductors 6, 7.

As illustrated in FIG. 3, insulating material layer 5 is covered with a further insulating material carrier layer 8, in which are provided light emitting diodes 9. The soldering lugs 10, 11 of the light emitting diodes 9 project out of layer 8 and penetrate the underlying layer 5, in which are provided the printed conductors 6, 7. As shown in FIG. 3, lugs 10, 11 come into contact with the printed conductors 6, 7, so that the light emitting diodes 9 are electrically connected by their lugs 10, 11 to conductors 6, 7. FIG. 2 shows the carrier layer 8 for the light emitting diodes in perspective detailed form, several such diodes 9 being embedded in layer 8. For reasons of simplicity, FIG. 2 only shows a few light emitting diodes. It is obvious that they can be arranged in much denser succession. It is decisive that all the light emitting elements assume the shape of a character or graphic symbol to be represented, so that said character or symbol appears as an active self-lighting body. FIG. 2 shows in broken line form the soldering lugs 10, 11 of light emitting diodes 9, which project downwards out of layer 8.

As can be seen in FIG. 3, the carrier layer 8 for the guide light emitting diodes 9 is covered by a plastic lens 12. In cross-section, lens 12 is approximately shaped like an elliptical segment, the ellipse being cut along its major semiaxis, being displaced somewhat with respect thereto in the direction of the edge region. There are two longitudinally directed lips 12a, 12b in one piece with plastic lens 12 and through which the outer profile of said lens is led out via the ellipse edge. Lips 12a, 12b are slightly undercut so that, accompanied by elastic deformation of lips 12a, 12b, lens 12 can be clipped onto the block formed from layers 2, 5 and 8. As a result of the optical action of lens 12, in much the same way as through the action of a reading scale, the light emitting diodes 9 appear in a magnified or enlarged form, so that the observer is given the impression of a large area light emitting element.

As best seen in FIG. 4, a battery 20 is provided to supply current to conductors 6 and 7. Resistor 21 is interconnected between one terminal of the battery and conductor 7 while a switch 22 is interconnected between another terminal of the battery 20 and the end of the conductor 6 in the known fashion.

The materials from which the illuminated character are made and matched to the thickness of said character are chosen in such a way that slight curvature is possible. This facilitates the application of the character to a curved substrate, such as e.g. to the trunk top of a motor vehicle.

If the illuminated character is adhered to a substrate, the aforementioned grooves 3, 4 are used for receiving excess adhesive, so that the character snugly engages on the substrate.

FIG. 5 shows a character group formed from the aforementioned illuminated letters, applied to the trunk top of a motor vehicle. It can be seen that the characters are adapted to the curvature of the trunk top.

There has been disclosed heretofore the best embodiment of the invention presently contemplated. However, it is to be understood that various changes and modifications may be made thereto without departing from the spirit of the invention.

What is claimed is:

1. A low air resistance illuminated character shaped element for conforming application to the surface of a moving vehicle comprising in combination:
   first and second insulating layers of deformable materials in contact with each other,
   said first layer being in contact with a carrier layer serving as a support and including illuminating element conductor means associated therewith,
   said second layer being in contact with a deformable arcuate shaped translucent cover member,
   said second layer further having associated therewith at least one illumination member interconnected with said conductor means, and
   layer assembly retention means along the edges of said cover member and said layers adapted to retain said cover member and said layers in superposed relationship.

2. The element of claim 1, wherein said assembly retention means is a portion of said cover member extending over and gripping the sides of said layers.

3. The element of claim 2, wherein said gripping portion of said cover member is provided with an undercut lip type structure.

4. The element of claim 3, wherein said cover member has lens optical properties.

5. The element of claim 4, wherein said carrier layer has longitudinal grooves on the side thereof in contact with said vehicle.

6. The element of claim 1, wherein said supply means is a battery.

* * * * *